United States Patent
McCalmont et al.

(10) Patent No.: US 9,502,903 B2
(45) Date of Patent: Nov. 22, 2016

(54) ENERGY MANAGEMENT SYSTEMS AND METHODS

(71) Applicants: Aaron William McCalmont, Santa Clara, CA (US); David Thompson McCalmont, Palo Alto, CA (US)

(72) Inventors: Aaron William McCalmont, Santa Clara, CA (US); David Thompson McCalmont, Palo Alto, CA (US)

(73) Assignee: McCalmont Corporation, Campbell, CA (US)

( * ) Notice: Subject to any disclaimer, the term of this patent is extended or adjusted under 35 U.S.C. 154(b) by 172 days.

(21) Appl. No.: 14/153,979

(22) Filed: Jan. 13, 2014

(65) Prior Publication Data

US 2014/0217983 A1 Aug. 7, 2014

Related U.S. Application Data (60) Provisional application No. 61/760,123, filed on Feb. 3, 2013.

(51) Int. Cl.
*H02J 7/00* (2006.01)
*H02J 3/38* (2006.01)
*H02J 1/10* (2006.01)
*H02J 7/35* (2006.01)

(52) U.S. Cl.
CPC .............. *H02J 3/383* (2013.01); *H02J 1/10* (2013.01); *H02J 7/35* (2013.01); *Y02E 10/563* (2013.01); *Y02E 10/566* (2013.01); *Y10T 307/68* (2015.04)

(58) Field of Classification Search
USPC ........................................... 320/128
See application file for complete search history.

(56) References Cited

U.S. PATENT DOCUMENTS

| 2003/0007369 | A1* | 1/2003 | Gilbreth et al. ............... 363/35 |
| 2011/0012430 | A1* | 1/2011 | Cheng ............... H01L 31/02021 307/82 |
| 2012/0212065 | A1* | 8/2012 | Cheng et al. .................. 307/82 |
| 2014/0055900 | A1* | 2/2014 | Luebke et al. ............... 361/93.1 |
| 2014/0265595 | A1* | 9/2014 | Cheng et al. .................. 307/66 |

* cited by examiner

Primary Examiner — Samuel Berhanu
(74) Attorney, Agent, or Firm — Steven R. Sponseller; Stevens Law Group (57) ABSTRACT

Example energy management systems and methods are described. In one implementation, a system includes an inverter and a combiner module coupled to the inverter. The combiner module receives DC signals from multiple DC sources and delivers a DC output signal. A control module manages a voltage and a current associated with the DC output signal delivered by the combiner module.

18 Claims, 5 Drawing Sheets

ENERGY MANAGEMENT SYSTEMS AND METHODS

RELATED APPLICATION

This application claims the benefit of U.S. Provisional Application Ser. No. 61/760,123, entitled "Energy Storage System," filed Feb. 3, 2013, the disclosure of which is incorporated herein by reference in its entirety.

TECHNICAL FIELD

The present disclosure relates to systems and methods that manage energy received from one or more energy sources.

BACKGROUND

Existing systems perform various types of energy conversion and energy storage. For example, some systems receive energy from one or more energy sources and store the received energy for future use. Other systems convert energy from DC (direct current) to AC (alternating current), typically via an inverter, or vice versa, typically via a transformer. Systems that receive energy from intermittent sources (e.g., solar cells or wind generators) need to make adjustments for changes in the amount of energy received. For example, solar cells temporarily provide a lower amount of energy when a cloud blocks light from the sun. In these systems, it is important to smooth out the temporary reductions in energy via an auxiliary power source.

Some systems that receive energy from multiple energy sources provide a separate inverter for each energy source. The use of multiple inverters increases the cost and complexity of such systems. Other systems provide inverters with multiple inputs to accommodate the multiple energy sources. These multiple-input inverters are more complex and expensive than single-input inverters.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which are shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The systems and methods described herein support the management and delivery of energy from multiple energy sources using a single inverter. For example, the described systems and methods support the efficient and cost-effective conversion of low voltage DC in a battery (at higher current) to high voltage DC (at lower current) for combining with and delivery to the same single inverter being utilized by other energy sources. As described herein, a control module manages the storage of energy within the system and the distribution of energy from different sources to an inverter. Additionally, the described systems and methods support converting electricity from high voltage DC or AC to low DC voltages for charging one or more battery-based energy storage devices (essentially reversing the previous operation).

Figure 1:
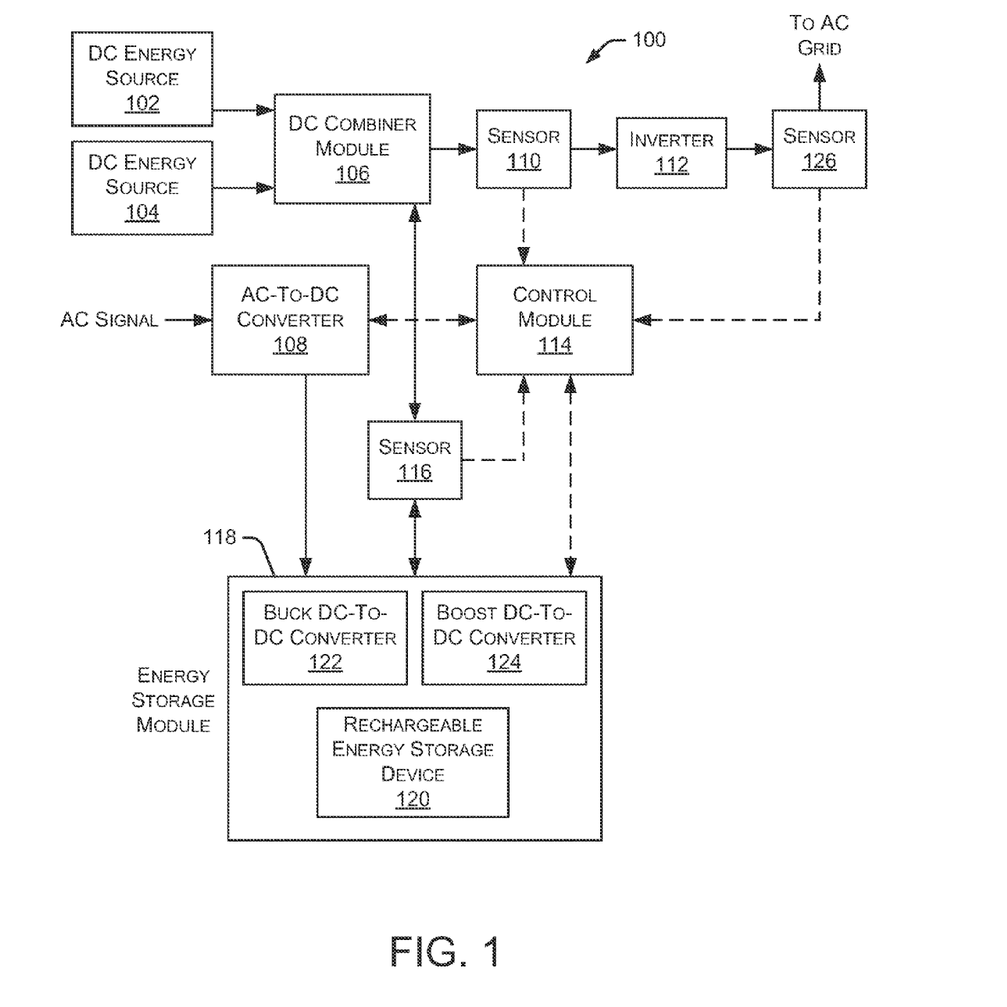
FIG. 1 is a block diagram depicting an embodiment of an energy management system.
Figure 2:
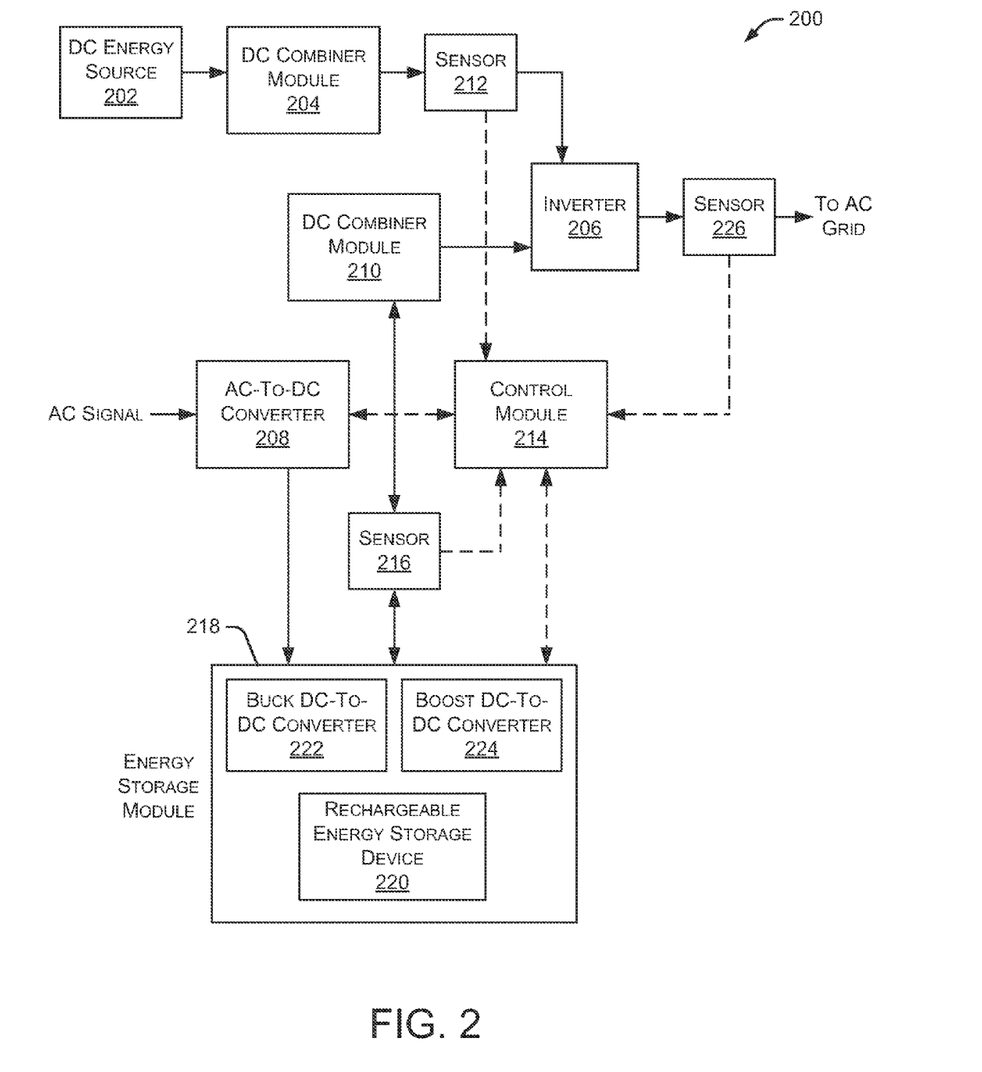
FIG. 2 is a block diagram depicting another embodiment of an energy management system.

FIG. 1 is a block diagram depicting an embodiment of an energy management system 100. As shown in FIG. 1, two DC energy sources 102 and 104 are coupled to a DC combiner module 106. As shown in FIG. 1, DC energy sources 102 and 104 are coupled to DC combiner module 106 with solid lines. The solid lines in FIG. 1 (and FIG. 2) represent power lines that deliver (or communicate) power or energy. Some lines in FIG. 1 and FIG. 2 are broken (or dashed) lines, which represent control lines that communicate control signals or other data between various illustrated components.

DC energy sources 102 and 104 represent any source of DC electrical energy, such as photovoltaic cells (also referred to herein as "solar cells"), solar generators, wind generated electricity, fuel cell electrical energy, generators, and batteries, and any other renewable or intermittent energy source. Although two DC energy sources 102 and 104 are shown in FIG. 1, alternate embodiments of energy management system 100 may include any number of DC energy sources. DC combiner module 106 receives one or more DC voltages from DC energy sources 102 and 104. An AC-to-DC converter 108 receives an AC voltage, converts the AC voltage to a DC voltage defined by a voltage signal from the control module 114, and provides the DC voltage to DC energy storage module 118. The AC signal provided to AC-to-DC converter 108 may be supplied, for example, from an AC power grid. DC combiner module 106 combines the energy received from DC energy sources 102 and 104 into a single DC energy signal.

A sensor 110 receives the DC energy signal generated by DC combiner module 106, and monitors the current and voltage levels associated with the DC energy signal. Information related to the monitored current and voltage levels is provided to control module 114. Additionally, the DC energy signal received by sensor 110 continues to an inverter 112, which converts the DC energy signal into an AC energy signal. The AC energy signal generated by inverter 112 is provided, for example, to an AC grid. Additionally, the AC energy signal generated by inverter 112 is communicated to control module 114 through sensor 126.

Control module 114 receives signals from AC-to-DC converter 108, DC combiner module 106 (via sensor 110), inverter 112, sensor 116, sensor 126, and an energy storage module 118. Based on the received signals, control module 114 manages various functions within system 100, as discussed herein. For example, control module 114 manages the flow of energy to and from energy storage module 118 based on one or more parameters. Additionally, sensor 126 monitors the operation of the AC grid and monitors the amount of energy usage being used to meet the customer's energy load. The monitoring by sensor 126 indicates to control module 114 whether additional power from other energy sources is needed, or whether surplus energy is available to charge the batteries based on the energy being produced by the energy sources and the energy demands of the current load.

Sensor 116 receives the DC energy signal generated by DC combiner module 106 and monitors the voltage and current levels associated with that DC energy signal. Information related to the monitored voltage and current levels is provided to control module 114. Sensor 116 is coupled to energy storage module 118 such that DC energy signals may pass through sensor 116 when flowing from DC combiner module 106 to energy storage module 118, and vice versa. Thus, DC energy signals may flow from DC combiner module 106 to charge energy storage module 118, or DC energy signals may flow from energy storage module 118 to DC combiner module 106, thereby discharging energy storage module 118 and providing additional energy to the DC energy signal output from DC combiner module 106 to inverter 112.

Energy storage module 118 includes a rechargeable energy storage device 120, a buck DC-to-DC converter 122, and a boost DC-to-DC converter 124. In some embodiments, rechargeable energy storage device 120 is a rechargeable battery. In other embodiments, rechargeable energy storage device 120 is implemented using any type of chemical, thermal, or mechanical energy storage device. Embodiments of energy storage module 118 may contain any number of rechargeable energy storage devices 120 based on the anticipated energy storage needs of energy management system 100. In particular implementations, energy storage module 118 allows for the addition of more rechargeable energy storage devices 120 at any time to increase the storage capacity of the energy storage module. Thus, the storage capacity of the energy storage module 118 is easily modified to meet the changing needs of energy management system 100.

Buck DC-to-DC converter 122 down-converts (i.e., "bucks") the received DC signal to a voltage level and current level that is appropriate for charging the rechargeable energy storage device 120. Buck DC-to-DC converter 122 may also be referred to as a "step-down converter." The rechargeable energy storage device 120 may include a battery management system that handles the charging and discharging of the rechargeable battery. Boost DC-to-DC converter 124 up-converts (i.e., "boosts") the DC energy from rechargeable energy storage device 120 to a voltage level and a current level that is appropriate for use by DC combiner module 106 and for delivery to inverter 112 contained in energy management system 100. Boost DC-to-DC converter 124 may also be referred to as a "step-up converter." Energy management system 100 is particularly useful when modifying an existing system to include the systems and methods described herein.

FIG. 2 is a block diagram depicting another embodiment of an energy management system 200. The system shown in FIG. 2 is similar to energy management system 100 shown in FIG. 1, but includes an additional DC combiner module. In energy management system 200, a DC energy source 202 is coupled to a DC combiner module 204, which is coupled to a sensor 212. Sensor 212 is coupled to an inverter 206, and communicates data regarding the sensed DC signal to a control module 214. For example, sensor 212 can communicate to control module 214 an indication of particular voltages or currents being delivered by energy source 202 through DC combiner 204 to inverter 206 so those voltages or currents may be matched by energy delivered from an energy storage module 218. A second DC combiner module 210 is coupled to a sensor 216 in a manner similar to energy management system 100 discussed above. Thus, inverter 206 receives DC energy signals from two different DC combiner modules (204 and 210), and converts the DC energy signals into an AC energy signal. The AC energy signal generated by inverter 206 is provided, for example, to an AC grid. Additionally, the AC energy signal generated by inverter 206 is detected by control module 214 through sensor 226.

Energy management system 200 also includes an energy storage module 218. Similar to energy storage module 118 described above with respect to FIG. 1, energy storage module 218 includes a rechargeable energy storage device 220, a buck DC-to-DC converter 222, and a boost DC-to-DC converter 224. These components operate in a manner similar to the corresponding components of energy storage system 100. Although one DC energy source 202 is shown in FIG. 2, alternate embodiments may include any number of energy sources coupled to DC combiner modules 204 and 210.

Energy management system 200 is particularly useful when modifying an existing system to include the systems and methods described herein. For example, an existing system may include DC energy source 202 and DC combiner module 204. The existing system is modified by adding the additional components shown in FIG. 2, thereby providing the additional functions supported by control module 214 and other components, as discussed herein. Alternatively, the existing system may include DC combiner module 210, which is modified to include the additional components shown in FIG. 2. Although two DC combiner modules 204 and 210 are shown in FIG. 2, alternate embodiments of energy management system 200 may include any number of DC combiner modules.

Figure 3:
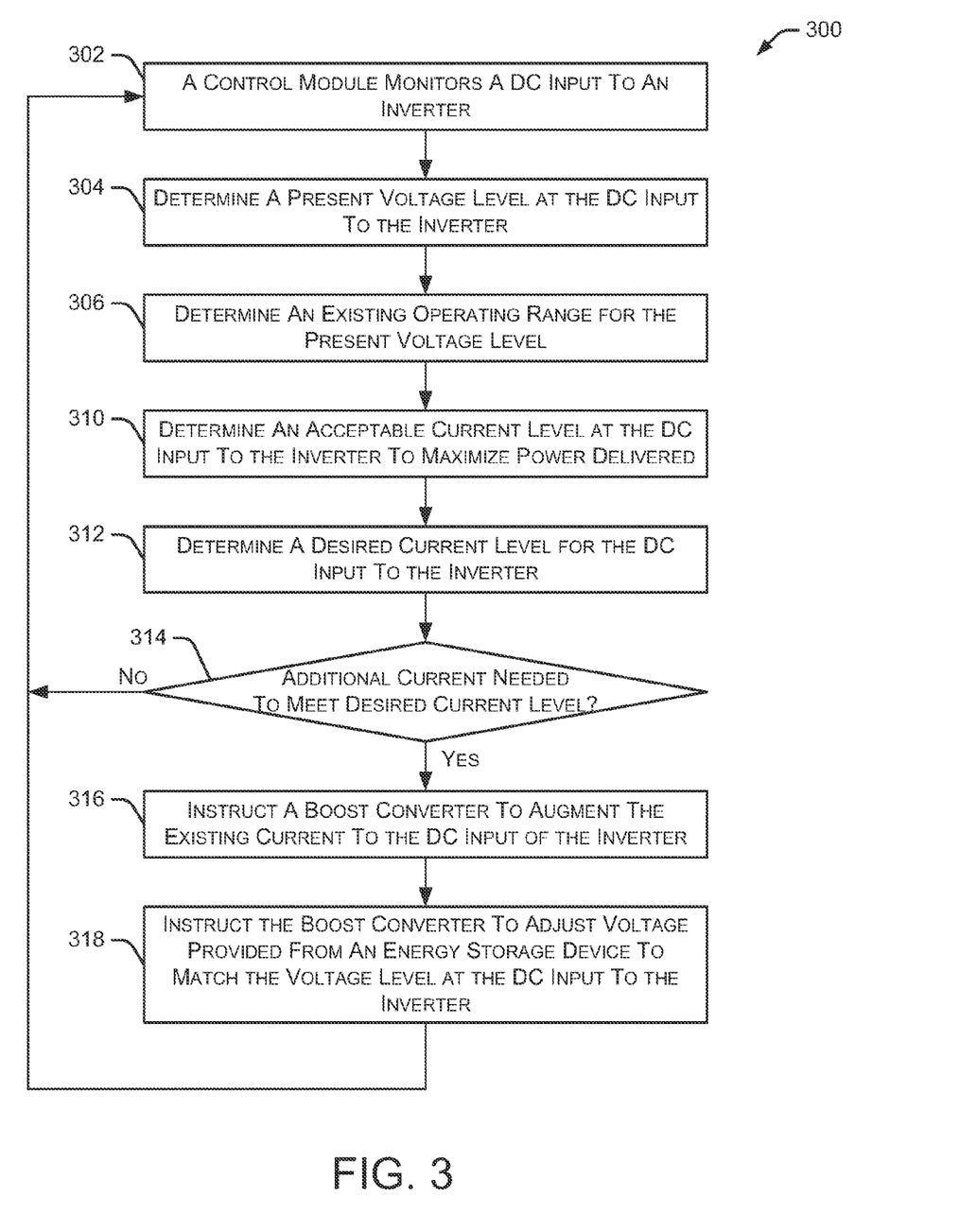
FIG. 3 is a flow diagram depicting an embodiment of a method for monitoring and adjusting DC energy.

FIG. 3 is a flow diagram depicting an embodiment of a method 300 for monitoring and adjusting DC energy. Method 300 is implemented, for example, within energy management system 100 shown in FIG. 1. Initially, a control module (e.g., control module 114 in FIG. 1) monitors a DC input to an inverter (e.g., inverter 112) at 302. The control module determines a present voltage level at the DC input to the inverter at 304 and determines an existing operating range for the present voltage level at 306. As discussed below, the control module will instruct the boost converter to match an acceptable voltage level. It is desirable to supply a substantially constant voltage level to inverter 112, which makes use of unused capacity in inverter 112. For example, if a cloud passes over a solar array, the current produced by the solar array is reduced. In this situation, inverter 112 is producing less power. Inverter 112 is operating at approximately the same voltage as before the cloud passed over the solar array, but inverter 112 is operating at a lower current. As described herein, control module 114 works with energy storage module 118 to match the voltage coming from the solar array, and deliver additional current that will bring inverter 112 back up to the power level it was producing before the cloud passed over the solar array.

Method 300 continues by determining an acceptable current level at the DC input to the inverter at 310 to maximize the power delivered. Method 300 also determines a desired current level for the DC input to the inverter at 312. In some embodiments, the determination of the existing current level and the desired current level is performed by control module 114. If additional current is not needed to meet the desired current level at 314, method 300 continues monitoring the DC input to the inverter at 302. However, if additional current is needed to meet the desired current level, method 300 instructs a boost converter (e.g., boost DC-to-DC converter 124) to augment the existing current to the DC input of the inverter at 316 to maintain the current at the desired current level. Additionally, the boost converter is instructed to adjust the voltage provided from an energy storage device (e.g., energy storage module 118) to match the voltage level at the DC input to the inverter at 318. Method 300 then continues monitoring the DC input to the inverter at 302.

Figure 4:
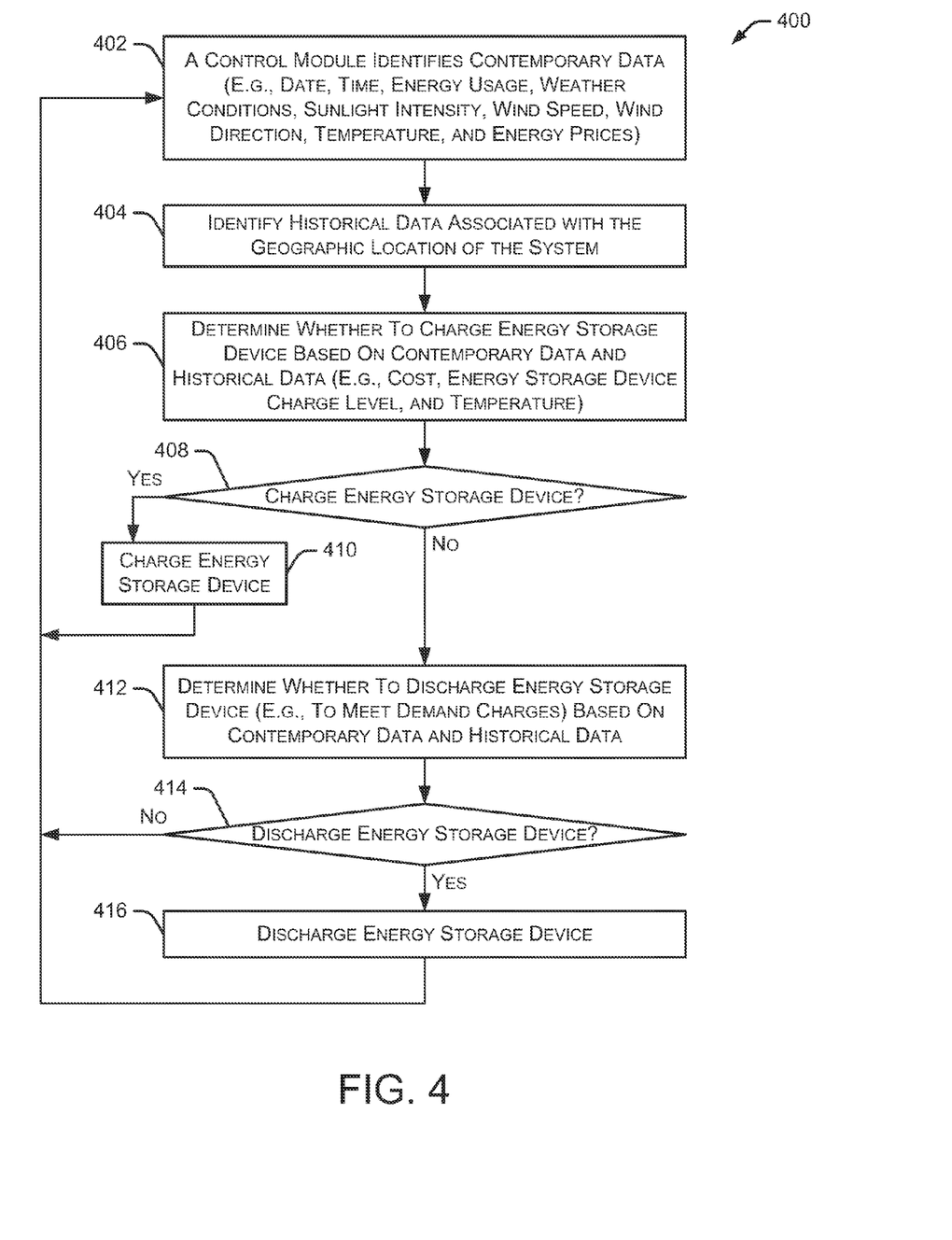
FIG. 4 is a flow diagram depicting an embodiment of a method for managing an energy storage device.

FIG. 4 is a flow diagram depicting an embodiment of a method 400 for managing an energy storage device. Method 400 is implemented, for example, within energy management system 100 shown in FIG. 1. Initially, a control module (e.g., control module 114 in FIG. 1) identifies contemporary data at 402. The contemporary data includes, for example, date, time, energy usage, weather conditions, sunlight intensity, wind speed, wind direction, temperature, and current grid energy prices. The control module also identifies historical data associated with the geographic location of the system at 404. In some embodiments, the historical data includes the same types of data identified at 402.

Method 400 continues by determining whether to charge an energy storage device (e.g., energy storage module 118 in FIG. 1) based on contemporary data and historical data at 406. When determining whether to charge the energy storage device, method 400 considers, for example, the contemporary energy cost, expected future energy cost, the contemporary charge level of the energy storage device, the contemporary temperature, expected future temperature, contemporary sunlight conditions, expected future sunlight conditions, contemporary wind conditions, expected future wind conditions, and the like. If a determination is made to charge the energy storage device at 408, method 400 causes the energy storage device to be charged at 410. The charging is performed, for example, by directing energy from DC combiner module 106 (FIG. 1) to energy storage module 118 or alternatively, by directing energy from AC to DC converter 108 to energy storage module 118. After charging the energy storage device, the method returns to identify contemporary data at 402.

In particular embodiments, the energy storage device is charged by a DC energy source when the DC energy source is active (e.g., during times of daylight for a photovoltaic cell) and charged by an AC energy source (e.g., the AC signal received by the AC-to-DC converter) when the DC energy source is not active (such as at night for solar panels).

If a determination is made not to charge the energy storage device at 408, method 400 continues by determining whether to discharge the energy storage device at 412 based on contemporary data and historical data. In some embodiments, the energy storage device is discharged to meet demand charges. For example, if a temporary increase in power is needed in the AC grid being served by the inverter, it may be cost effective to discharge the batteries to meet the increased power need. The batteries can be recharged at a later time, when the power, or demand charge, cost is less expensive. Demand charges are typically charged for instantaneous kilowatts used (i.e., power). In contrast, energy charges in kilowatt-hours are for energy consumed over a period of time. If a determination is made to discharge the energy storage device at 414, the method continues by discharging the energy storage device at 416. The discharging is performed, for example, by directing energy from energy storage module 118 (FIG. 1) to DC combiner module 106. After discharging the energy storage device (or determining not to discharge the energy storage device), the method returns to identify current data at 402.

In addition to managing the charging and discharging of the energy storage device to reduce demand charges, the systems and methods described herein are useful in regulating the frequency of an AC signal provided to the grid (e.g., increasing or decreasing the frequency of the AC signal to adjust the AC signal to a preferred 60 Hz), or in smoothing the delivery of energy from a renewable power source to mitigate intermittency (e.g., to prevent the fall-off of energy being delivered to the inverter when a cloud goes over a solar array or the wind drops off for a wind turbine). Additionally, the described systems and methods are useful in various other applications.

Figure 5:
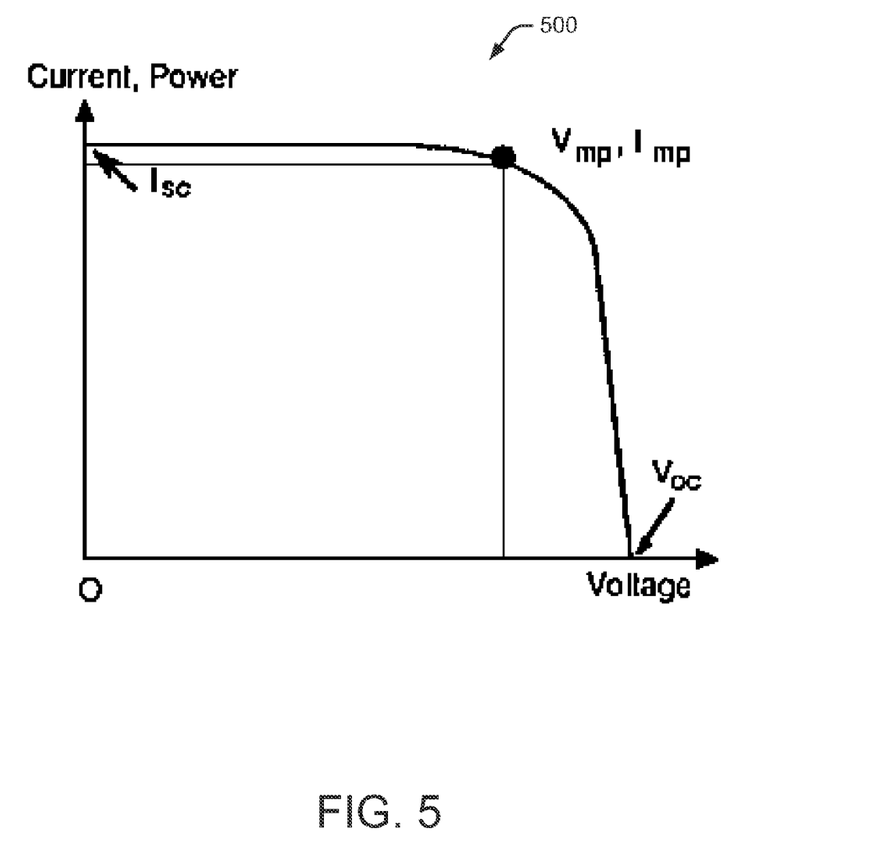
FIG. 5 is a diagram depicting an embodiment of a power curve associated with a solar array.

FIG. 5 is a diagram depicting an embodiment of a power curve 500 associated with a solar array. Power curve 500 is illustrated as an IV curve with current on y-axis and voltage on x-axis. Isc represents the short circuit solar array current (when voltage is zero) and Voc represents the open circuit solar array voltage (when current is zero). Typical solar inverters perform maximum power point tracking, referred to as MPPT, which finds the highest power output for the solar array by moving along the IV curve for that particular solar array to find the best Vmp (Voltage at maximum power) and Imp (Current at maximum power). The combination of Vmp and Imp allow for the maximum power production of that solar array (power equals voltage times current so the maximum power occurs when both voltage and current are at simultaneous maximums along the curve). Typical inverters make this MPPT determination for a solar array. The systems and methods described herein match the solar array Vmp and then supply additional Imp to provide the necessary power input to the inverter, as required by the user's loads and energy needs at any given time.

Additionally, the voltage of a solar array is proportional to temperature and, therefore, does not change much over a wide range of currents (as represented by the substantially flat vertical portion of curve 500). The current changes according to light intensity and, therefore, changes every time the light changes (based on clouds, time of day, and the like). The inverter attempts to match both the voltage and the current to maximize power output from the solar array. Thus, the inverter is always "hunting" for the apex of the curve 500, which is where the most power is generated (V×I=P). This function of inverters is what is referred to as MPPT, discussed above.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
   an inverter;
   a combiner module coupled to the inverter, the combiner module configured to receive DC signals from a plurality of DC sources, the combiner module further configured to deliver a DC output signal to the inverter; and
   a control module coupled to the combiner module, the control module configured to adjust a signal from an energy storage module to match a voltage and current at one or more locations along an I-V curve associated with at least one of the plurality of DC sources, wherein the signal from the energy storage module is delivered to the inverter.

2. The apparatus of claim 1, wherein the energy storage module is coupled to the combiner module and the control module, the control module further configured to manage charging and discharging of the energy storage module.

3. The apparatus of claim 2, wherein the control module is further configured to select one of the plurality of DC sources to charge the energy storage module.

4. The apparatus of claim 2, wherein the energy storage module includes:
   a boost DC-to-DC converter configured to increase a DC voltage;
   a buck DC-to-DC converter configured to reduce a DC voltage; and
   a rechargeable energy storage device.

5. The apparatus of claim 1, wherein the plurality of DC sources includes at least one of a solar cell, a wind generator, a fuel cell, and a battery.

6. The apparatus of claim 1, wherein the combiner module is further configured to deliver the DC output signal to an input of the inverter.

7. The apparatus of claim 1, wherein the control module is further configured to manage a voltage and current associated with the DC output signal.

8. An apparatus comprising:
   an inverter;
   a first combiner module coupled to the inverter, the first combiner module configured to receive DC signals from a first plurality of DC sources, the first combiner module further configured to generate a first DC output signal;
   a second combiner module coupled to the inverter, the second combiner module configured to receive DC signals from a second plurality of DC sources, the second combiner module further configured to generate a second DC output signal; and
   a control module coupled to the first combiner module and the second combiner module, the control module configured to adjust a signal from an energy storage module to match a voltage and current at one or more locations along an I-V curve associated with at least one of the second plurality of DC sources, wherein the signal from the energy storage module is delivered to the inverter.

9. The apparatus of claim 8, wherein the control module is further configured to manage a voltage and current associated with the first DC output signal and the second DC output signal.

10. The apparatus of claim 8, wherein the first combiner module receives DC signals from at least one of a solar cell, a wind generator, a fuel cell, and a battery.

11. The apparatus of claim 8, wherein the second combiner module receives DC signals from at least one of:
   a solar cell; and
   an energy storage device.

12. The apparatus of claim 8, wherein the second combiner module receives DC signals from at least one of:
   a wind generator; and
   an energy storage device.

13. The apparatus of claim 8, wherein the second combiner module receives DC signals from at least one of:
   a fuel cell; and
   an energy storage device.

14. The apparatus of claim 8, wherein the second combiner module receives DC signals from at least one of:
   an intermittent energy source; and
   an energy storage device.

15. A method comprising:
   determining a present voltage level at a DC input to an inverter;
   determining, by a control module, an acceptable current level at the DC input to the inverter to maximize power delivered;
   determining, by the control module, a desired current level for the DC input to the inverter, wherein the desired current level is based on an I-V curve associated with a DC source;
   determining, by the control module, whether additional current is needed to meet the desired current level; and
   responsive to determining that additional current is needed:
      the control module instructing a boost converter to augment the existing current to the DC input of the inverter based on the desired current level for the DC input to the inverter; and
      the control module instructing a boost converter to adjust voltage provided from an energy storage device to match the present voltage level at the DC input to the inverter.

16. The method of claim 15, further comprising monitoring the DC input to the inverter.

17. The method of claim 15, wherein the DC input to the inverter is received from at least one DC source.

18. The method of claim 17, wherein the at least one DC source is at least one of a solar cell, a wind generator, a fuel cell, and a battery.

* * * * *